(12) United States Patent
Murakami

(10) Patent No.: US 8,310,708 B2
(45) Date of Patent: Nov. 13, 2012

(54) IMAGE FORMING APPARATUS

(75) Inventor: Koichi Murakami, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 190 days.

(21) Appl. No.: 12/957,717

(22) Filed: Dec. 1, 2010

(65) Prior Publication Data

US 2011/0128581 A1    Jun. 2, 2011

(30) Foreign Application Priority Data

Dec. 2, 2009  (JP) ................. 2009-274018

(51) Int. Cl.
*G06F 3/12* (2006.01)
(52) U.S. Cl. .................................... 358/1.15
(58) Field of Classification Search ......... None
See application file for complete search history.

(56) References Cited

U.S. PATENT DOCUMENTS

2006/0290680 A1   12/2006   Tanaka et al.

FOREIGN PATENT DOCUMENTS

| CN | 1893529 | 1/2007 |
|---|---|---|
| JP | 2002-135867 | 5/2002 |
| JP | 2003-125155 | 4/2003 |
| JP | 2005-065053 | 3/2005 |

*Primary Examiner* — Marivelisse Santiago Cordero
*Assistant Examiner* — Mesfin Getaneh
(74) *Attorney, Agent, or Firm* — David G. Conlin; Steven M. Jensen; Edwards Wildman Palmer LLP

(57) ABSTRACT

To a multi-functional peripheral, an external terminal is connected by an external user who performs a remote operation or remote monitoring of an operation for the operation screen. The multi-functional peripheral has a specific user determination portion which determines whether or not the external user who has made the connection is a remote monitoring user who performs remote monitoring, and when the external user who has made the connection is not the remote monitoring user, an operation screen during connection displaying information to show that the external terminal is being connected is displayed, and when the external user is the remote monitoring user, a normal operation screen without the information to show that the external terminal is being connected is displayed.

4 Claims, 8 Drawing Sheets

IMAGE FORMING APPARATUS

CROSS-NOTING PARAGRAPH

This non-provisional application claims priority under 35 U.S.C. §119(a) on Patent Application No. 2009-274018 filed in JAPAN on Dec. 2, 2009, the entire contents of which are hereby incorporated herein by reference.

FIELD OF THE INVENTION

The present invention relates to an image forming apparatus which is able to be remotely operated and an operating state thereof is able to be remotely monitored from an external terminal.

BACKGROUND OF THE INVENTION

There has been a technology of accessing an image forming apparatus such as a multi-functional peripheral from an information processing apparatus such as a personal computer (PC) and displaying an operation screen which is the same as a content displayed in the image forming apparatus on the information processing apparatus in order to remotely operate functions of the image forming apparatus through the operation screen. Japanese Laid-Open Patent Publication No. 2005-65053 discloses a technology in which a multi-functional peripheral performs user authentication of a user who gains access thereto from a PC for a remote operation, and when the user authentication of the user is successful, information of the user such as a user ID is displayed on an operation screen of the multi-functional peripheral to show that the external terminal is being connected thereto by the authenticated user.

In addition to the above-described remote operation technology, there has been proposed a similar technology of remotely monitoring the presence/absence of unauthorized use or a normal operating state.

Also as to a user who performs remote monitoring by the information processing apparatus, showing that the external terminal is being connected by displaying the user information on the operation screen in the case of user authentication like the technology disclosed in Japanese Laid-Open Patent Publication No. 2005-65053 causes the fact that the remote monitoring is being performed to be known by others.

SUMMARY OF THE INVENTION

An object of the present invention is to provide an image forming apparatus which, when an external terminal is connected thereto by an external user who performs a remote operation or remote monitoring, switches as to whether or not to display information showing that the external terminal is being connected on an operation screen depending on an external user who has made the connection.

Another object of the present invention is to provide an image forming apparatus to which an external terminal is connected by an external user who performs a remote operation or remote monitoring of an operation for an operation screen, comprising: a specific user determination portion which determines whether or not the external user who has made the connection is a remote monitoring user who performs remote monitoring, wherein when the external user who has made the connection is not the remote monitoring user, an operation screen during connection that displays information showing that the external terminal is being connected is displayed as the operation screen, and when the external user who has made the connection is the remote monitoring user, a normal operation screen without the information showing that the external terminal is being connected is displayed as the operation screen.

Another object of the present invention is to provide the image forming apparatus, wherein determination as to whether or not the external user who has made the connection is the remote monitoring user is performed based on whether or not the connected external terminal is a specific external terminal, or whether or not the external user who has made the connection had been previously registered as the remote monitoring user.

Another object of the present invention is to provide the image forming apparatus, wherein determination as to whether or not the external user who has made the connection is the remote monitoring user is performed based on purpose of connection information showing a purpose of connection input from the external terminal.

Another object of the present invention is to provide the image forming apparatus, comprising: a warning target user determination portion which determines whether or not a user who operates the image forming apparatus is a warning target user, wherein when the user who operates the image forming apparatus is the warning target user, irrespective of whether or not the external user who has made the connection is the remote monitoring user, the operation screen during connection is displayed as the operation screen.

PREFERRED EMBODIMENTS OF THE INVENTION

An image forming apparatus of the present invention is, for example, configured as a multi-functional peripheral and has an image forming function and/or an image reading function, and these functions are able to be remotely operated by an external terminal and an operation for an operation panel is able to be remotely monitored from an external terminal.

First Example

Figure 1:
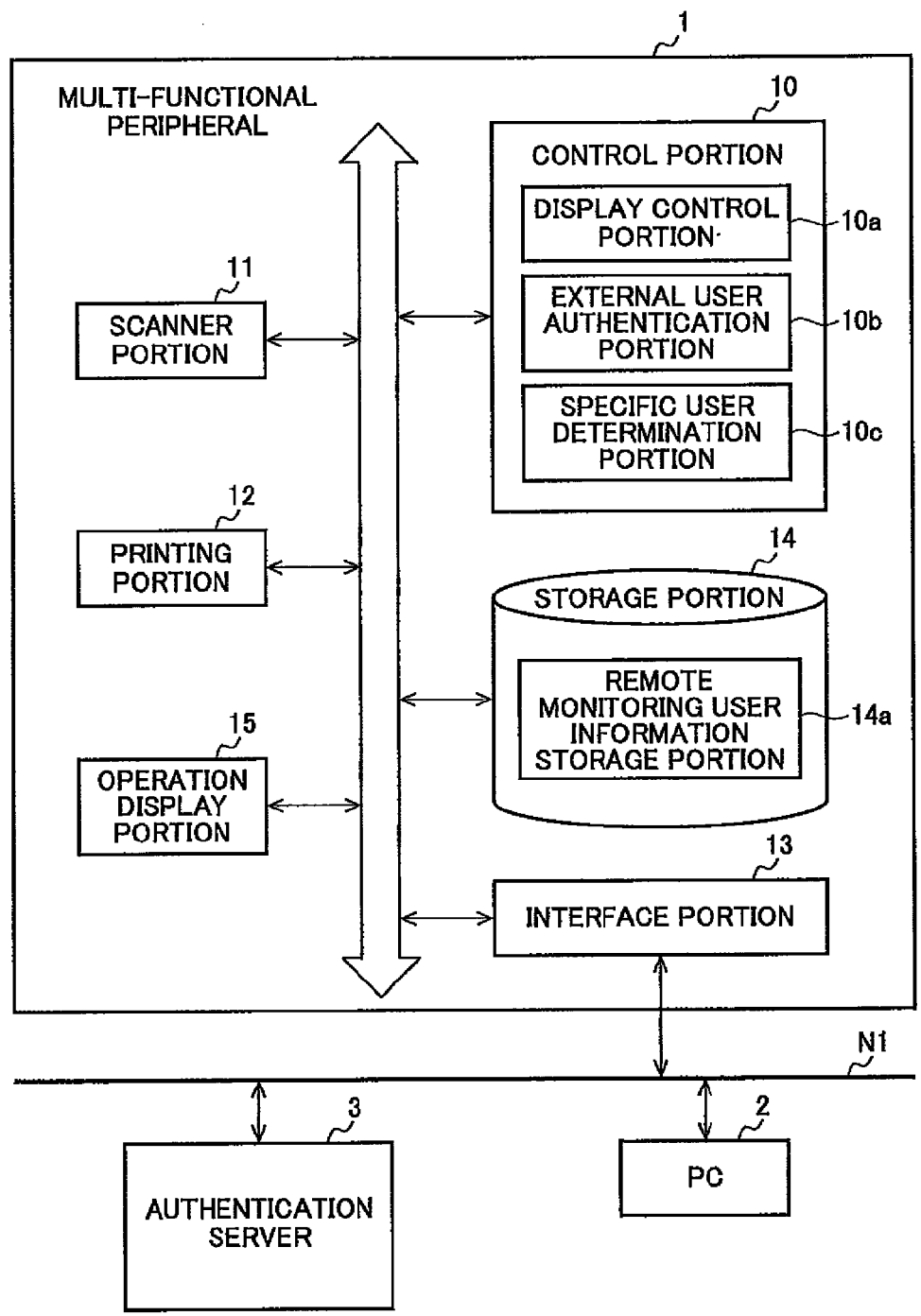
FIG. 1 is a block diagram illustrating a configuration example of a multi-functional peripheral as an image forming apparatus of a first example of the present invention.
Figure 2:
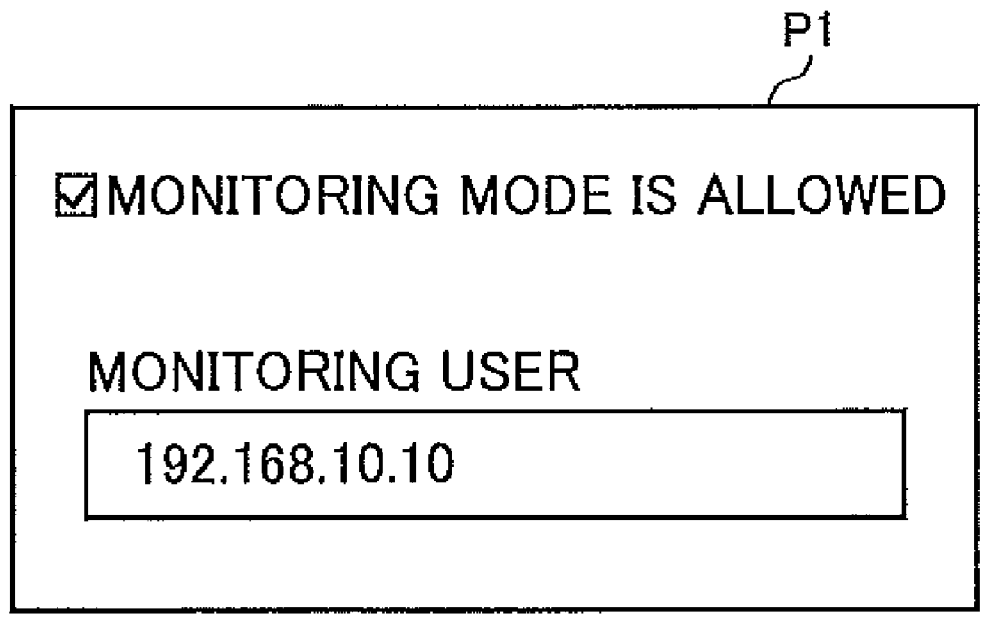
FIG. 2 is a diagram illustrating an example of an operation screen for previously registering information of a user who performs remote monitoring.
Figure 3A:
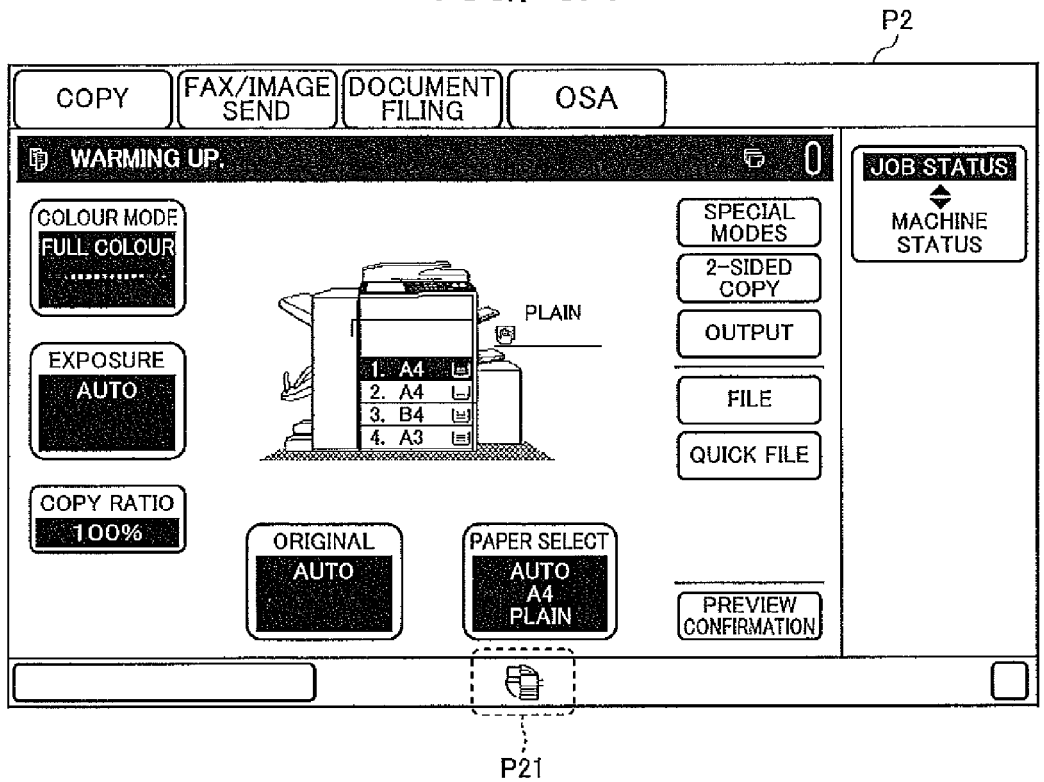
FIG. 3A and FIG. 3B are diagrams illustrating an example of an operation screen displayed by the image forming apparatus of FIG. 1.
Figure 3B:
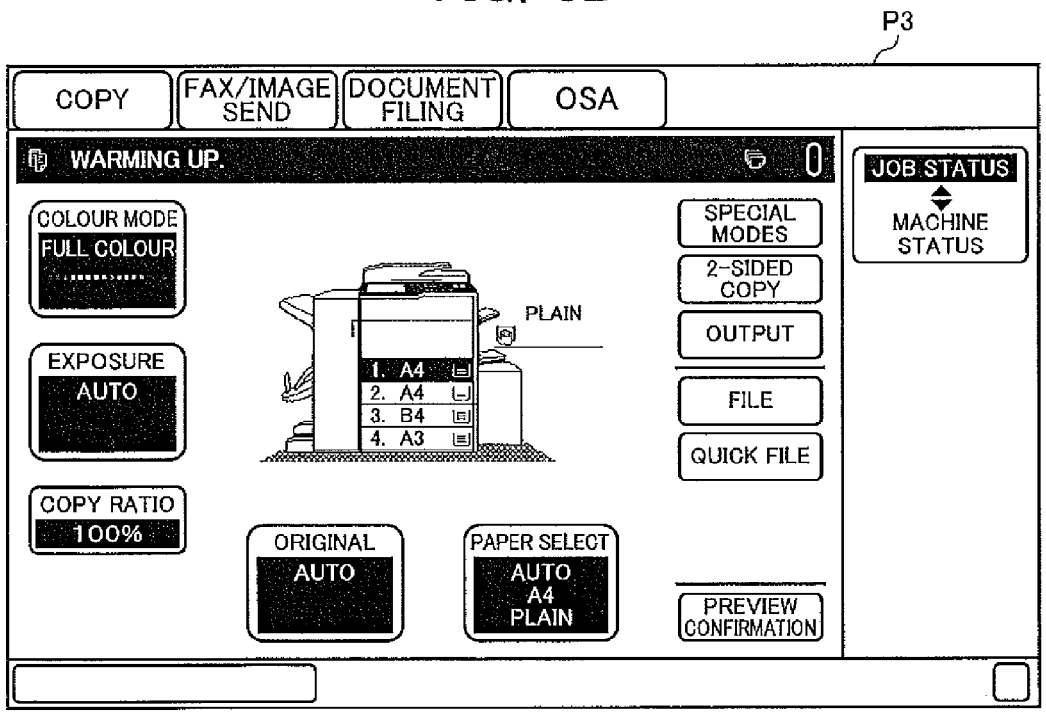

Description will be given for an image forming apparatus of a first example of the present invention using FIG. 1 to FIG. 313. FIG. 1 is a block diagram illustrating a configuration example of a multi-functional peripheral as the image forming apparatus of the first example of the present invention, FIG. 2 is a diagram illustrating an example of an operation screen for previously registering information of a user who performs remote monitoring, and FIG. 3A and FIG. 3B are diagrams illustrating an example of an operation screen displayed by the image forming apparatus of FIG. 1.

A multi-functional peripheral 1 of FIG. 1 which is the image forming apparatus of the present example includes a control portion 10, a scanner portion 11, a printing portion 12, an interface portion 13, a storage portion 14 and an operation display portion 15. Further, the multi-functional peripheral 1 is provided with functions of a copier, a printer apparatus, and a scanner apparatus, and connected to a PC 2 and an authentication server 3 which are external terminals through a network N1 so as to be able to communicate therewith.

The control portion 10 is composed of a CPU for performing operation, a RAM for storing temporary information associated with the operation, etc. This control portion 10 includes a ROM which stores a control program for controlling the multi-functional peripheral 1. Furthermore, the control portion 10 has a display control portion 10a, an external user authentication portion 10b and a specific user determination portion 10c. The display control potion 10a controls display of the display portion of the operation display portion 15. The external user authentication portion 10b is authentication means for authenticating with reference to the authentication server 3, an external user who makes a connection to the multi-functional peripheral 1 from a PC 2 in order to remotely operate it or remotely monitor an operation to the input portion of the operation display portion 15. The external user authentication portion 10b performs authentication with using a user account name and a password of an external user, for example. Description for the specific user determination portion 10c will be given below.

The scanner portion 11 functions as an image reading portion for reading an image recorded on a recording sheet to generate image data, and the printing portion 12 functions as an image forming portion for forming an image on a recording sheet. The multi-functional peripheral 1 is able to form an image on a recording sheet in the printing portion 12 based on the image data generated by the scanner portion 11. In this manner, the multi-functional peripheral 1 functions as a copier.

The interface portion (hereinbelow, I/F portion) 13 is connectable to the network N1 such as an in-house LAN (Local Area Network) to which a plurality of PCs 2 or the authentication server 3 which is a server computer for performing authentication such as external user authentication which will be described below. The multi-functional peripheral 1 exchanges information with the external terminals such as the PC 2 and the authentication server 3 through the network N1 by using the I/F portion 13.

Furthermore, the multi-functional peripheral 1 is able to transmit the image data generated by the scanner portion 11 from the I/F portion 13. In this way, the multi-functional peripheral 1 functions as a scanner apparatus. Furthermore, the multi-functional peripheral 1 is able to form an image in the printing portion 12 based on the image data received from the PC 2 through the I/F portion 13. In this way, the multi-functional peripheral 1 functions as a printer apparatus.

The storage portion 14 is composed of a Hard Disk Drive (HDD), for example, and stores image data, etc. obtained by the scanner portion 11. Description will be given below for a remote monitoring user information storage portion 14a of the storage portion 14.

The operation display portion 15 receives an operation from a user and is composed of an input portion such as a touch panel or a numeral keypad to which information such as control command is input by an operation of a user, and a display portion such as a liquid crystal panel for displaying information required for an operation screen or operations.

The PC 2 which is the external terminal is connected with the multi-functional peripheral 1 so as to be able to communicate therewith through a network interface for connecting to various communication networks. This PC 2 performs a remote operation of the multi-functional peripheral 1 and remote monitoring of an operation for the input portion of the operation display portion 15 of the multi-functional peripheral 1. The PC 2 obtains information of an operation screen to be displayed on the operation display portion 15 of the multi-functional peripheral 1 from the multi-functional peripheral 1 and displays the same operation screen on the display portion 22 so as to enable the above-described remote operation and remote monitoring using the operation screen.

Subsequently, description will be given for a characteristic part of the present example.

The multi-functional peripheral 1 stores remote monitoring user information which is information on external users who are allowed to perform remote monitoring from the PC 2 in the remote monitoring user information storage portion 14a. The remote monitoring user information is, for example, an IP address of the PC 2 which is allowed to perform remote monitoring, and is previously registered by an administrator of the multi-functional peripheral 1 operating an operation screen P1 shown in FIG. 2.

The multi-functional peripheral 1 performs authentication of an external user in the external user authentication portion 10b when the external user makes a connection thereto through the PC 2 for performing a remote operation or remote monitoring. When authentication has been completed, the specific user determination portion 10c performs a determination of whether or not the authenticated external user is a remote monitoring user who is recognized as a specific user who performs remote monitoring based on whether or not the external user is making the connection through the PC 2 which is allowed to perform remote monitoring. In this case, the determination is performed based on whether or not the IP address of the PC 2 used by the authenticated external user is stored in the remote monitoring user information storage portion 14a.

Then, in the case where the external user is not making the connection through the PC 2 allowed to perform remote monitoring and does correspond to the remote monitoring user, the multi-functional peripheral 1 displays on the operation display portion 15 an operation screen during connection P2, as shown in FIG. 3A, on which an icon P21 showing that an external terminal is being connected by an authenticated external user is displayed.

On the other hand, in the case where the external user is making the connection through the PC 2 allowed to perform remote monitoring and corresponds to the remote monitoring user, the multi-functional peripheral 1 does not display the above-described icon P21 on the operation screen and displays a normal operation screen P3 as shown in FIG. 3B on the operation display portion 15.

As described above, in the multi-functional peripheral 1, when the PC 2 which is not for remote monitoring, that is, the PC 2 for remote operation is being connected thereto, the icon showing that connection is being made is displayed on the operation screen, and when the PC 2 for remote monitoring is being connected thereto, the above-described icon is not displayed on the operation screen. Thereby, when the external terminal is connected and an external user is in the remote operation of the multi-functional peripheral 1, it is possible to cause the user to recognize by the above-described display that there is a possibility that printing may be performed by a remote operation or other user may not use the multi-functional peripheral 1. On the other hand, when the external user is the specific user who performs remote monitoring, the above-described display is not performed and therefore, the remote monitoring is able to be performed without being known by an operator of the multi-functional peripheral 1.

In the above, an IP address of the PC 2 used by the authenticated external user is used as the remote monitoring user information for determining whether or not the authenticated external user is the remote monitoring user, however, other apparatus information for identifying the PC 2 such as a computer name may be used instead, for example. Moreover, individual information for identifying an individual user such as a user account name or the like may be used as the remote monitoring user information.

Figure 4:
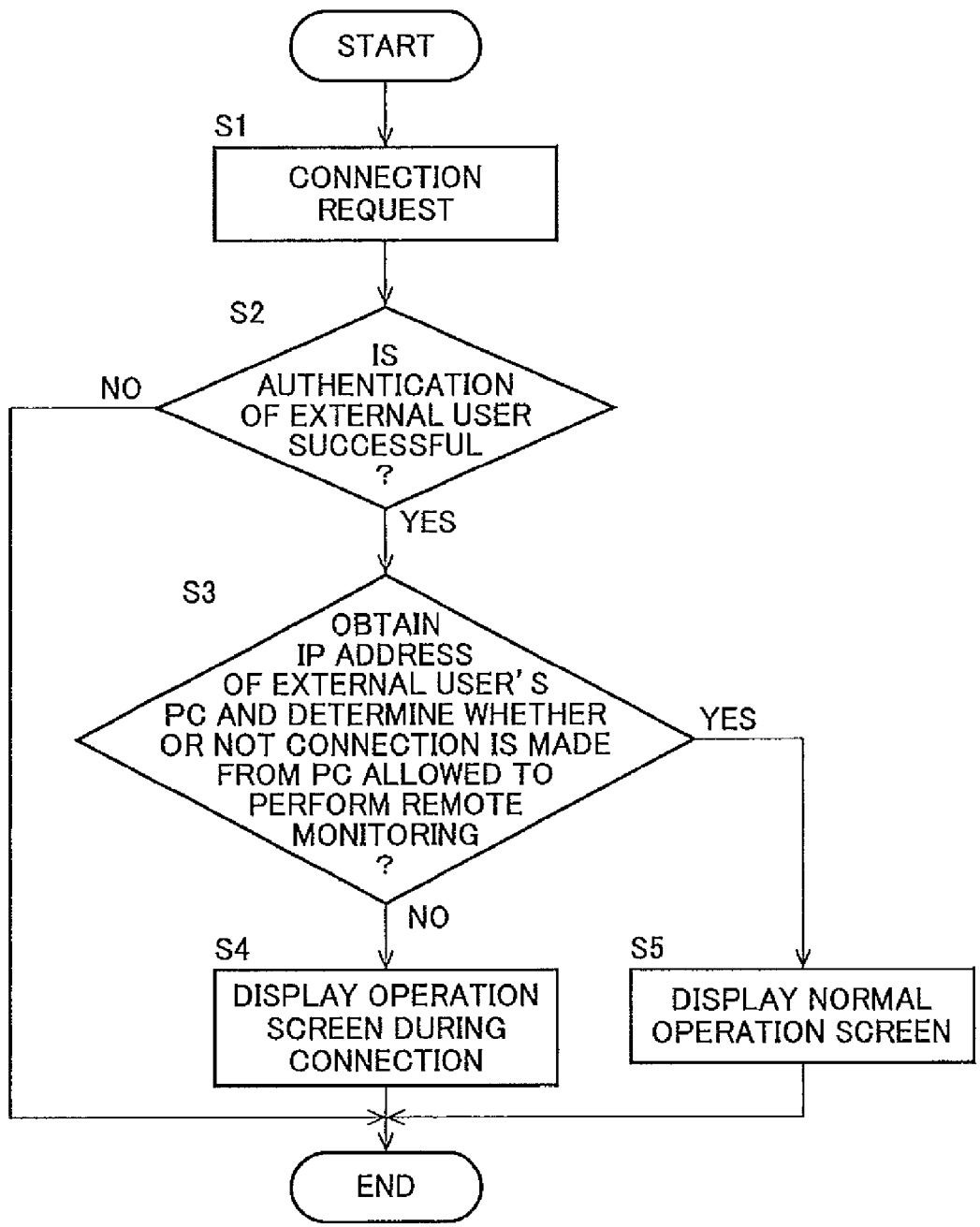
FIG. 4 is a flowchart illustrating a processing example of the multi-functional peripheral of FIG. 1 when a PC 2 is connected thereto by an external user who performs a remote operation or remote monitoring.

FIG. 4 is a flowchart illustrating a processing example of the multi-functional peripheral of FIG. 1 when the PC 2 is connected thereto by an external user who performs a remote operation or remote monitoring.

As illustrated, when a connection request for the remote operation or the remote monitoring is given (step S1), the multi-functional peripheral 1 obtains a user ID and a password of the external user who has given the connection request from the PC 2 and performs authentication of the external user in the external user authentication portion 10b with reference to the authentication server 3 (step S2). Then, when the authentication has been completed (in the case of YES), the multi-functional peripheral 1, after returning the authentication result to the PC 2 and establishing the connection with the PC 2 to enable transmission/reception of data or a command for the remote operation or the remote monitoring, obtains the IP address of the PC 2 of a connection request source which the authenticated external user uses, and the specific user determination portion 10c determines, based on the IP address, whether or not the PC allowed to perform remote monitoring is connected (step S3).

At the step S3, in the case where the obtained IP address is not stored in the remote monitoring user information storage portion 14a, and determination is made that the PC allowed to perform remote monitoring is not connected (in the case of NO), the operation screen during connection P2 of FIG. 3A which displays the icon P21 showing that the external user is being connected is displayed on the operation display portion 15 (step S4). On the other hand, in the case where the obtained IP address is stored in the remote monitoring user information storage portion 14a, and determination is made that the PC allowed to perform remote monitoring is connected (in the case of YES), a normal operation screen P3 of FIG. 3B without the icon of the connection being made is displayed on the operation display portion 15 (Step S5). Note that, at the step S2, when the authentication of the external user has failed (in the case of NO), after the authentication result is returned to the PC 2, the processing is finished.

Second Example

Figure 5:
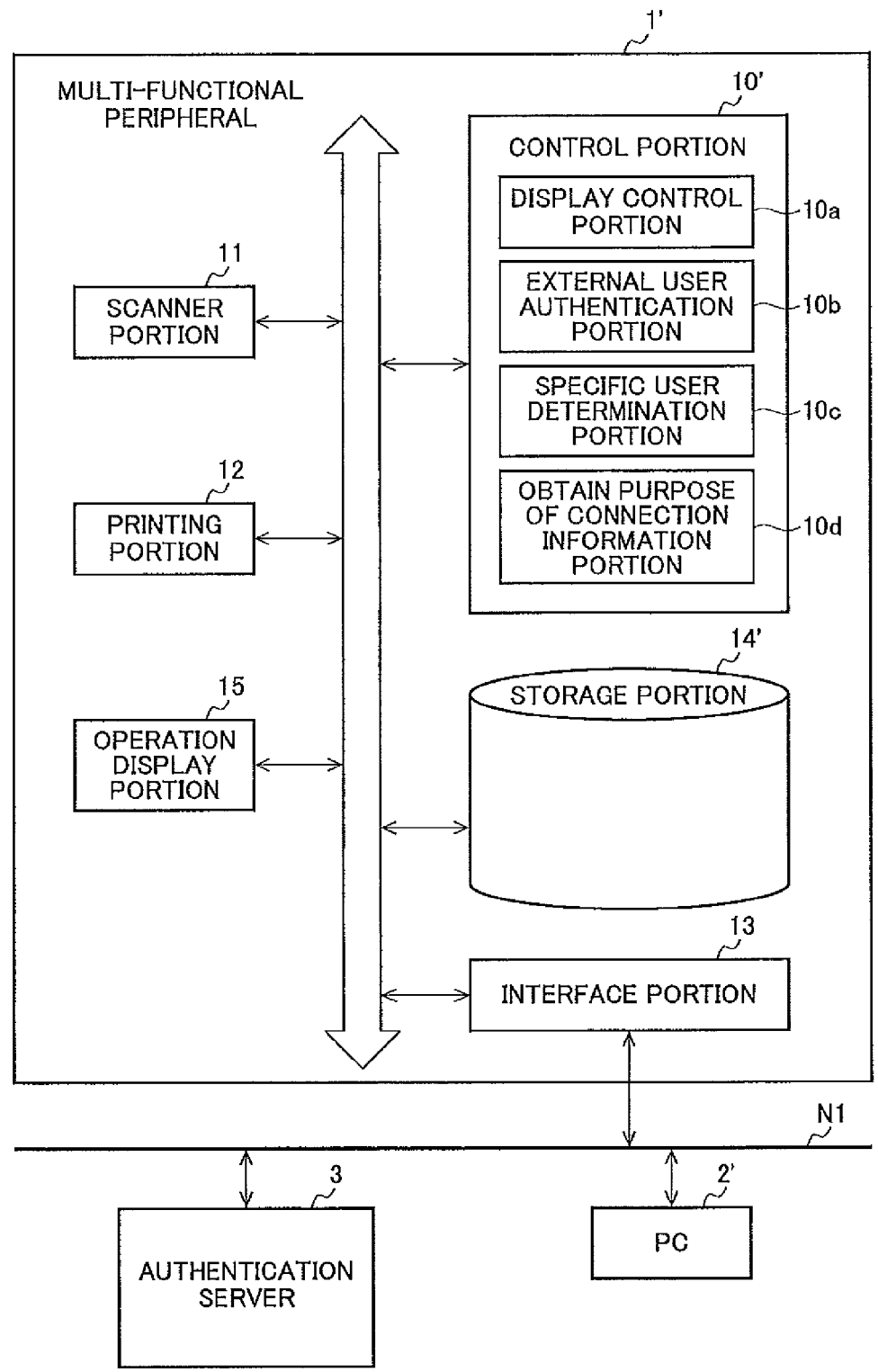
FIG. 5 is a block diagram illustrating a configuration example of a multi-functional peripheral as an image forming apparatus of a second example of the present invention.

FIG. 5 is a block diagram illustrating a configuration example of a multi-functional peripheral as an image forming apparatus of a second example of the present invention. Note that, in the present example, constituent parts similar to those of the first example are denoted by the same reference numerals and the description thereof will be omitted.

In the present example, unlike the first example, purpose of connection information showing whether the purpose of connection is the remote operation or the remote monitoring is input into a multi-functional peripheral 1' from a PC 2'. In the multi-functional peripheral 1', the input above-described purpose of connection information is obtained in a purpose of connection information obtaining portion 10d of a control portion 10', and a specific user determination portion 10c' determines whether or not the external user is the remote monitoring user based on the purpose of connection information. Then, the multi-functional peripheral 1' displays an icon showing that the connection is being made on the operation screen in the case where the input purpose of connection information shows that the purpose of connection of the external user is the remote operation and the external user is not the remote monitoring user, and does not display the above-described icon on the operation screen in the case where the input purpose of connection information shows that the purpose of connection of the external user is the remote monitoring and the external user is the remote monitoring user.

Figure 6:
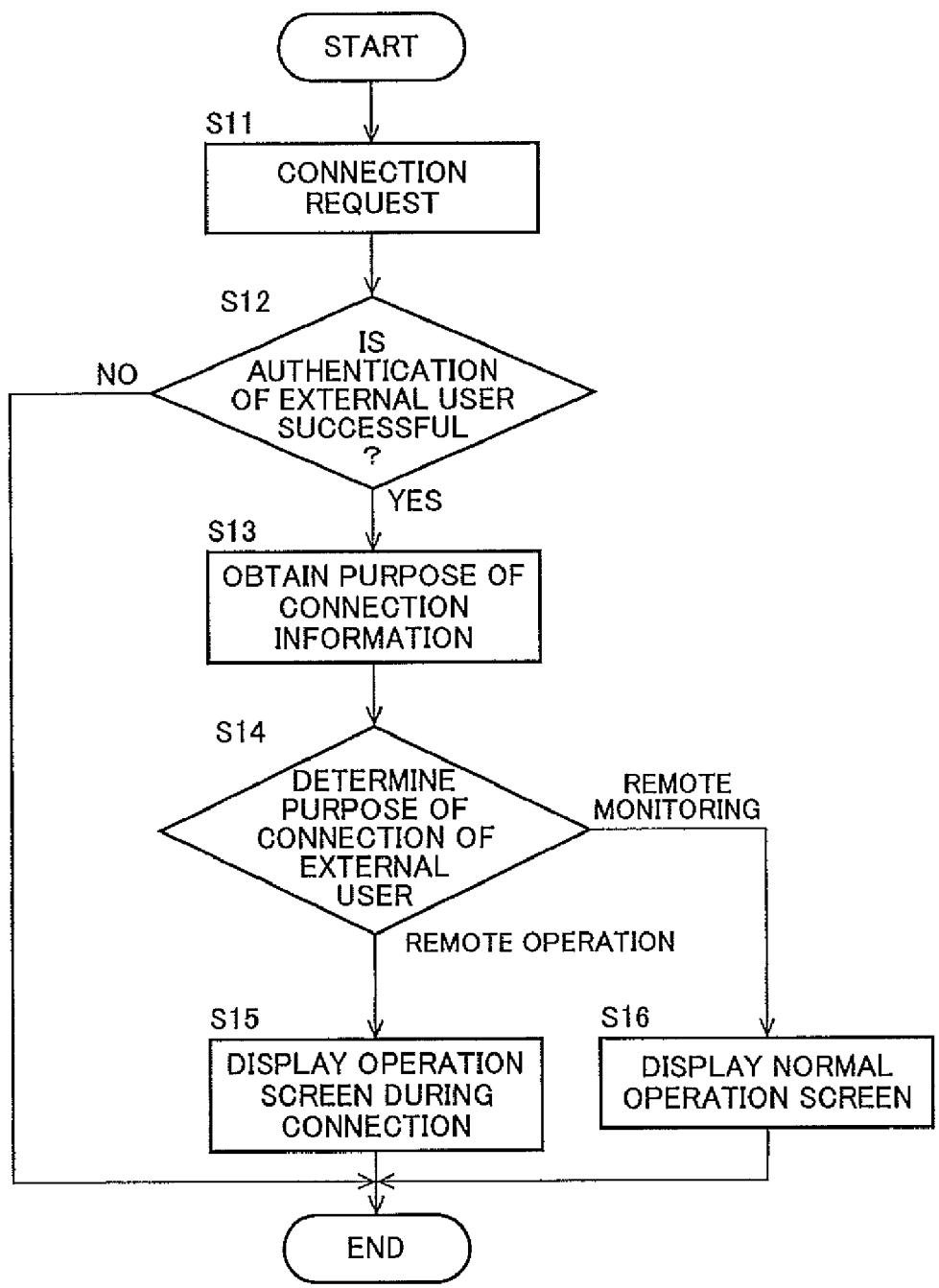
FIG. 6 is a flowchart illustrating a processing example of the multi-functional peripheral of FIG. 5 when a PC is connected thereto by an external user who performs a remote operation or remote monitoring.

FIG. 6 is a flowchart illustrating a processing example of the multi-functional peripheral of FIG. 5 when a PC is connected thereto by an external user who performs a remote operation or remote monitoring.

In the multi-functional peripheral 1', as illustrated, when the PC 2 is connected thereto by an external user who performs a remote operation or remote monitoring (step S11), like the multi-functional peripheral 1 of the first example, authentication of the external user is performed by the external user authentication portion 10b (step S12), however, when the authentication has been completed (in the case of YES at step S12), unlike the multi-functional peripheral 1 of the first example, the purpose of connection information obtaining portion 10d obtains the purpose of connection information input from the PC 2' at the time of connection request (step S13) and the processing is progressed to step S14. Note that, the input timing of the purpose of connection information from the PC 2' is not limited to the connection request time and the input may be performed after the user authentication.

At the step S14, the specific user determination portion 10c' determines whether the purpose of connection of the external user is the remote operation or the remote monitoring based on the obtained purpose of connection information.

At the step S14, in the case where determination is made that purpose of connection of the external user is the remote operation, that is, when the external user is the remote operating user, the operation screen during connection P2, as shown in FIG. 3A, displaying the icon P21 showing that connection is being made is displayed on the operation display portion 15 (step S15). On the other hand, at the step S14, in the case where determination is made that the purpose of connection of the external user is the remote monitoring, that is, when the external user is the remote monitoring user, the above-described icon P21 is not displayed, but the normal operation screen P3 as shown in FIG. 3B is displayed on the operation display portion 15 (Step S16).

Third Example

Figure 7:
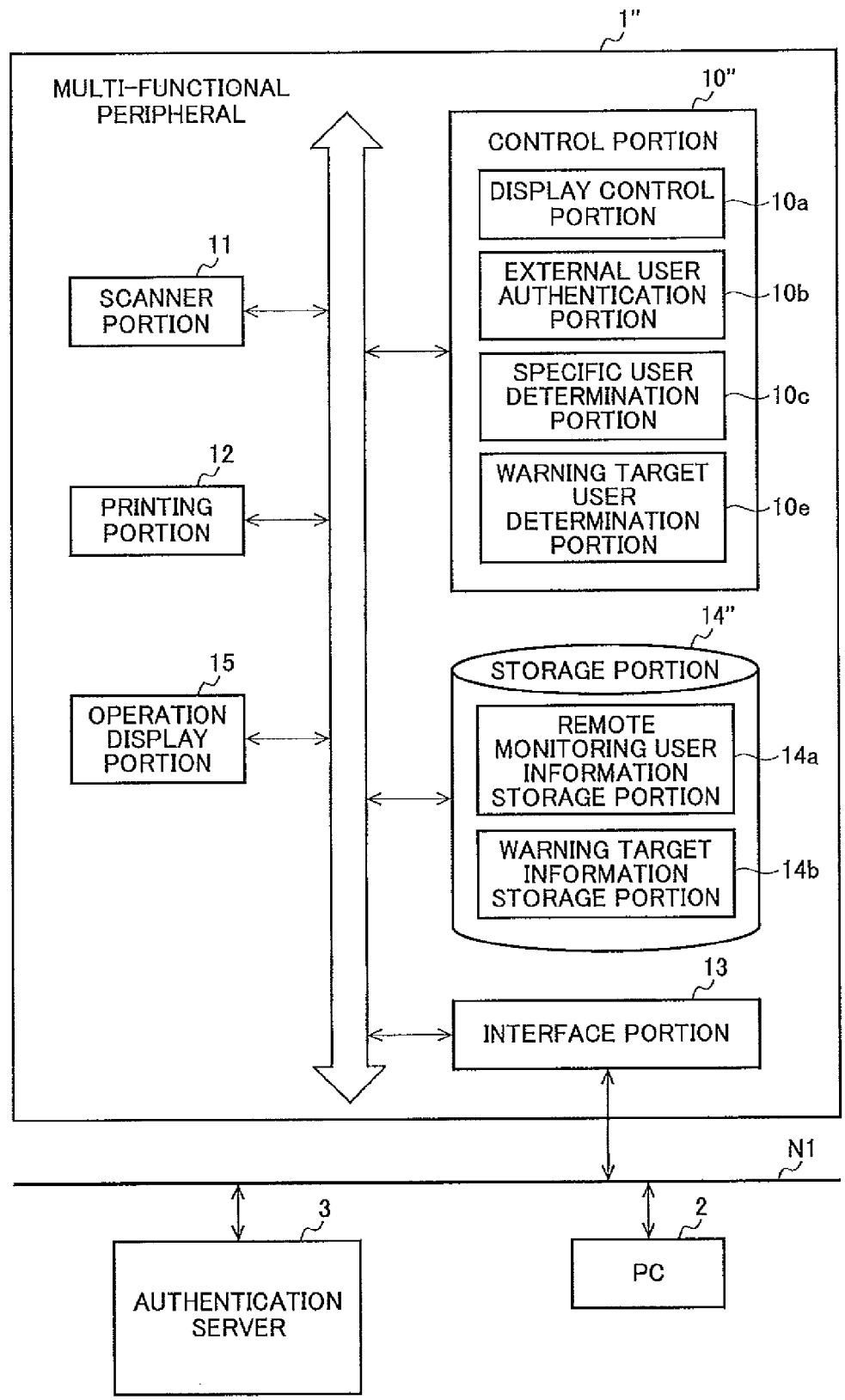
FIG. 7 is a block diagram illustrating a configuration example of a multi-functional peripheral as an image forming apparatus of a third example of the present invention.

FIG. 7 is a block diagram illustrating a configuration example of a multi-functional peripheral as an image forming apparatus of a third example of the present invention. Note that, in the present example, constituent parts similar to those of the first example are denoted by the same reference numerals and the description thereof will be omitted.

In a multi-functional peripheral 1" of the present example, a storage portion 14" includes a warning target information storage portion 14b which previously stores warning target user information such as a user account name concerning a warning target user who may perform unauthorized use. In addition to that, a control portion 10" has a warning target user determination portion 10e which determines whether or not a user operating the multi-functional peripheral 1" is the warning target user which has been previously stored with reference to the warning target information storage portion 14b. The multi-functional peripheral 1", when the external user is being connected thereto for remote monitoring, basically does not display an icon, etc., showing that the connection is being made, however, when the operating user of the multi-functional peripheral 1" is the warning target user, the above-described icon, etc., is displayed on the operation screen to give notice that the warning target user is possibly performing remote monitoring. Thereby the unauthorized use by the warning target user is able to be suppressed.

Figure 8:
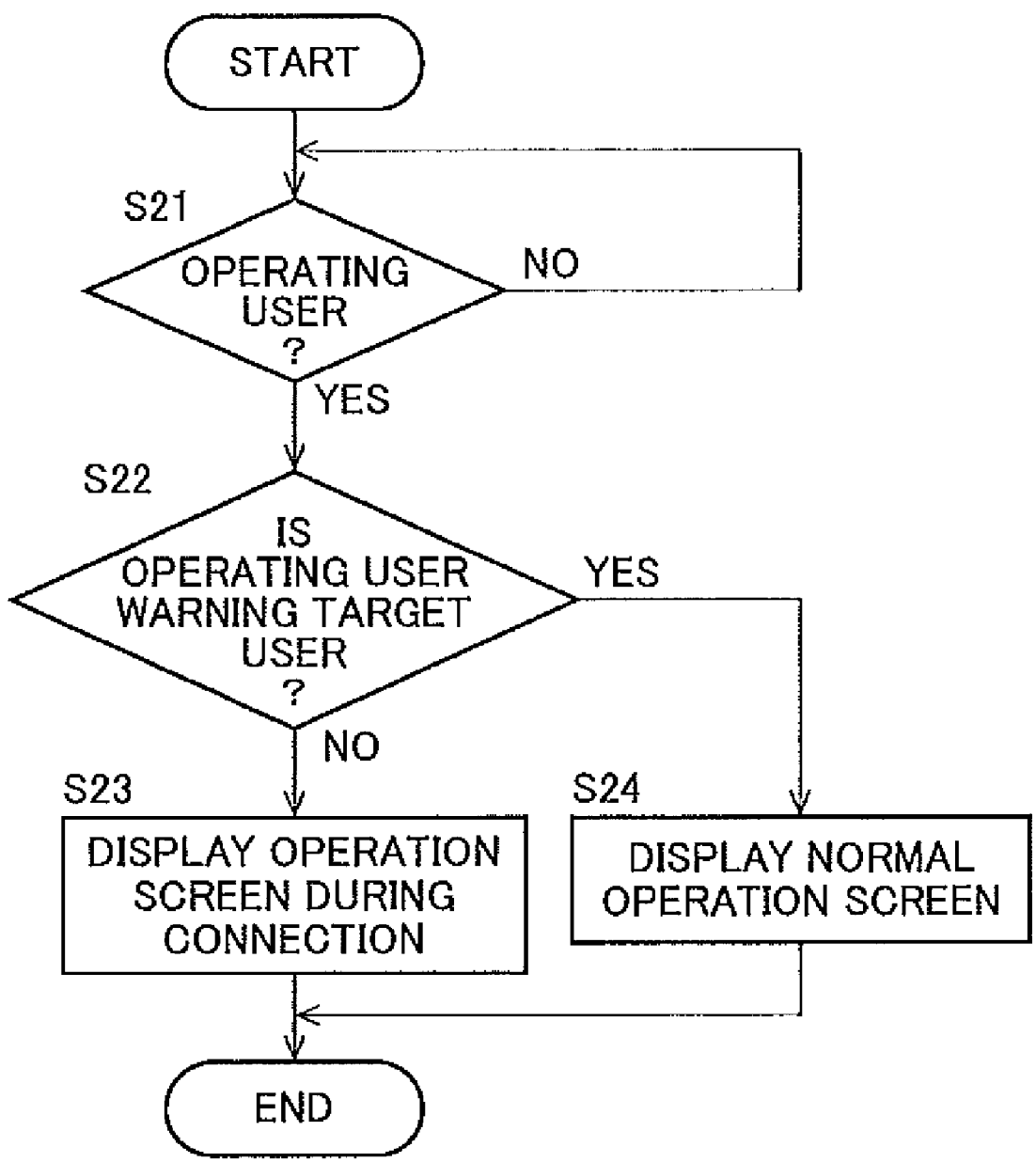
FIG. 8 is a flowchart illustrating a display processing example of an operation screen of the multi-functional peripheral of FIG. 7.

FIG. 8 is a flowchart illustrating a display processing example of an operation screen of the multi-functional peripheral of FIG. 7.

The multi-functional peripheral 1" determines whether or not there is a user who directly or remotely operates the multi-functional peripheral 1" (step S21). When there is no such user (in the case of NO), the processing is returned to the step S21, however, when there is such a user (in the case of YES), the warning target user determination portion 10e determines whether or not the operating user is the warning target user using the user information at the time of login of the operating user with reference to the warning target information storage portion 14b (step S22).

At the step S22, when the user information of the operating user is not stored in the warning target information storage portion 14b and the operating user is not the warning target user (in the case of NO), the normal operation screen P3 of FIG. 3B is displayed on the operation display portion 15 as usual (step S23).

On the other hand, at the step S22, when the user information of the operating user is stored in the warning target information storage portion 14b and the operating user is the warning target user (in the case of YES), the operation screen during connection P2, of FIG. 3A, displaying the icon P21 showing that the external user is being connected is displayed on the operation display portion 15 (step S24).

Thereby, when a user specified as the warning target operates the multi-functional peripheral, the display of the connection being made is performed regardless of presence/absence of the remote monitoring connection and thus giving warning to the user, and therefore the unauthorized use is able to be suppressed.

According to the image forming apparatus of the present invention, an external terminal is connected thereto by an external user who performs a remote operation or remote monitoring, and switching is able to be made as to whether or not to display information showing that the external terminal is being connected on an operation screen depending on the external user who has made the connection, and remote monitoring is able to be performed without being known by a user operating the image forming apparatus that the remote monitoring is being performed.

The invention claimed is:

1. An image forming apparatus to which an external terminal is connected by an external user who performs a remote operation or remote monitoring of an operation for an operation screen, comprising:
   a specific user determination portion which determines whether or not the external user who has made the connection is a remote monitoring user who performs remote monitoring, wherein
   when the external user who has made the connection is not the remote monitoring user, an operation screen during connection that displays information showing that the external terminal is being connected is displayed as the operation screen, and
   when the external user who has made the connection is the remote monitoring user, a normal operation screen without the information showing that the external terminal is being connected is displayed as the operation screen.

2. The image forming apparatus as defined in claim 1, wherein determination as to whether or not the external user who has made the connection is the remote monitoring user is performed based on whether or not the connected external terminal is a specific external terminal, or whether or not the external user who has made the connection had been previously registered as the remote monitoring user.

3. The image forming apparatus as defined in claim 1, wherein determination as to whether or not the external user who has made the connection is the remote monitoring user is performed based on purpose of connection information showing a purpose of connection input from the external terminal.

4. The image forming apparatus as defined in any one of claims 1 to 3, comprising:
   a warning target user determination portion which determines whether or not a user who operates the image forming apparatus is a warning target user, wherein
   when the user who operates the image forming apparatus is the warning target user, irrespective of whether or not the external user who has made the connection is the remote monitoring user, the operation screen during connection is displayed as the operation screen.

* * * * *